United States Patent [19]

Moss

[11] Patent Number: 4,476,667
[45] Date of Patent: Oct. 16, 1984

[54] CORN PICKUP ATTACHMENT FOR A COMBINE

[76] Inventor: Donald Moss, Tallula, Ill.

[21] Appl. No.: 482,426

[22] Filed: Apr. 6, 1983

[51] Int. Cl.³ ............................................. A01D 45/02
[52] U.S. Cl. ............................................ 56/119; 56/106
[58] Field of Search .................. 56/98, 106, 108, 109, 56/111, 119, 14.2

[56] References Cited

U.S. PATENT DOCUMENTS

| | | | |
|---|---|---|---|
| 3,331,196 | 7/1967 | Grant | 56/106 |
| 3,572,018 | 3/1971 | Broussard | 56/119 |
| 3,584,444 | 6/1971 | Sammann | 56/119 |
| 3,600,878 | 8/1971 | Lynch | 56/119 |
| 3,646,737 | 3/1972 | Grant | 56/106 |
| 3,719,034 | 3/1973 | Lange | 56/119 |
| 4,137,695 | 2/1979 | Sammann | 56/119 |

Primary Examiner—Gene Mancene
Assistant Examiner—John G. Weiss
Attorney, Agent, or Firm—Sherman Levy

[57] ABSTRACT

A corn pickup attachment for a combine is provided wherein the combine is adapted to be propelled along the ground and there is provided a unique and highly efficient framework together with a novel means for gathering corn and the like that has fallen to the ground. A hydraulic motor is provided for driving a shaft which operates a plurality of chains that carry pickup fingers that are positioned above the usual pickup snouts of the corn pickup attachment for a combine.

2 Claims, 5 Drawing Figures

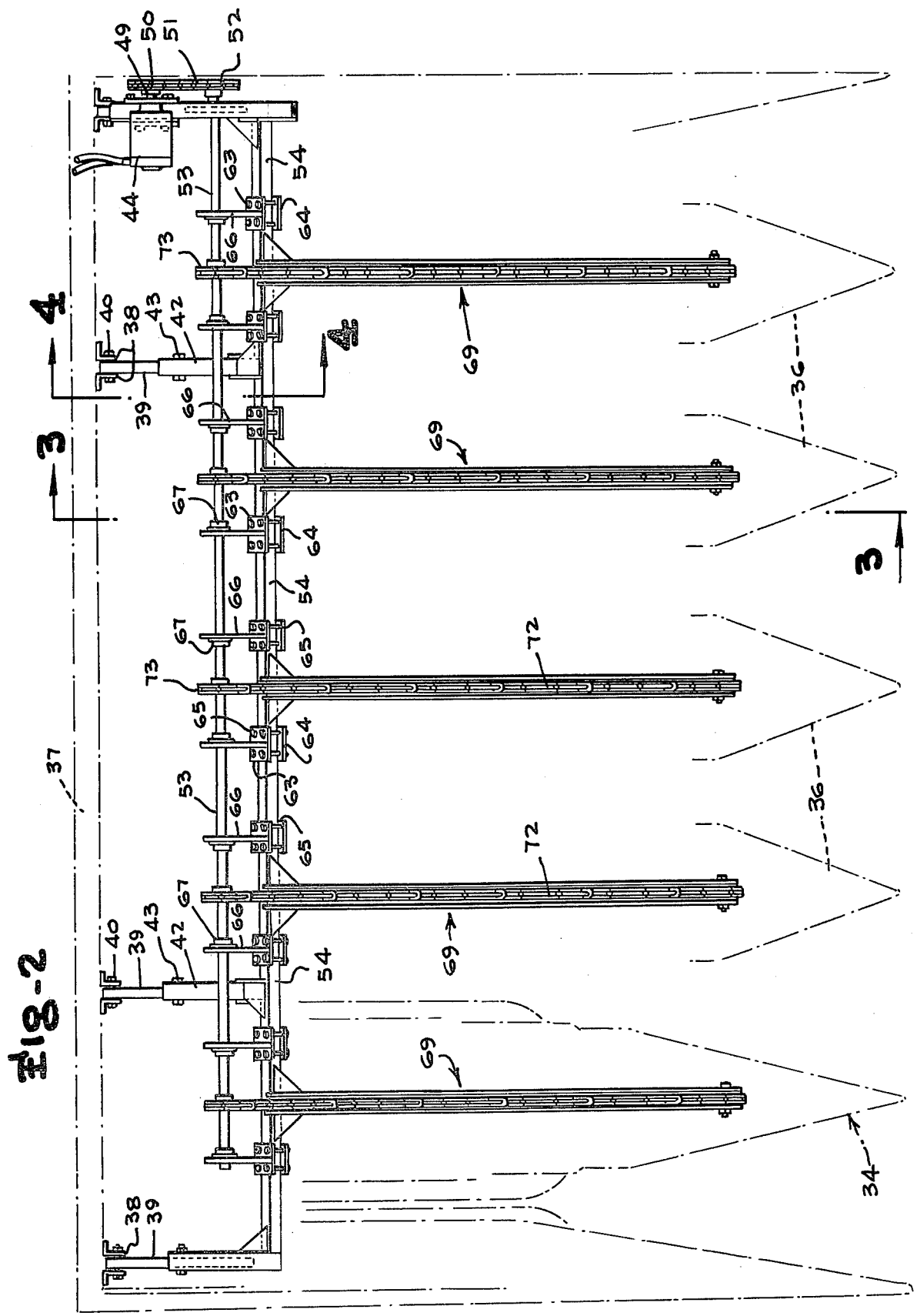

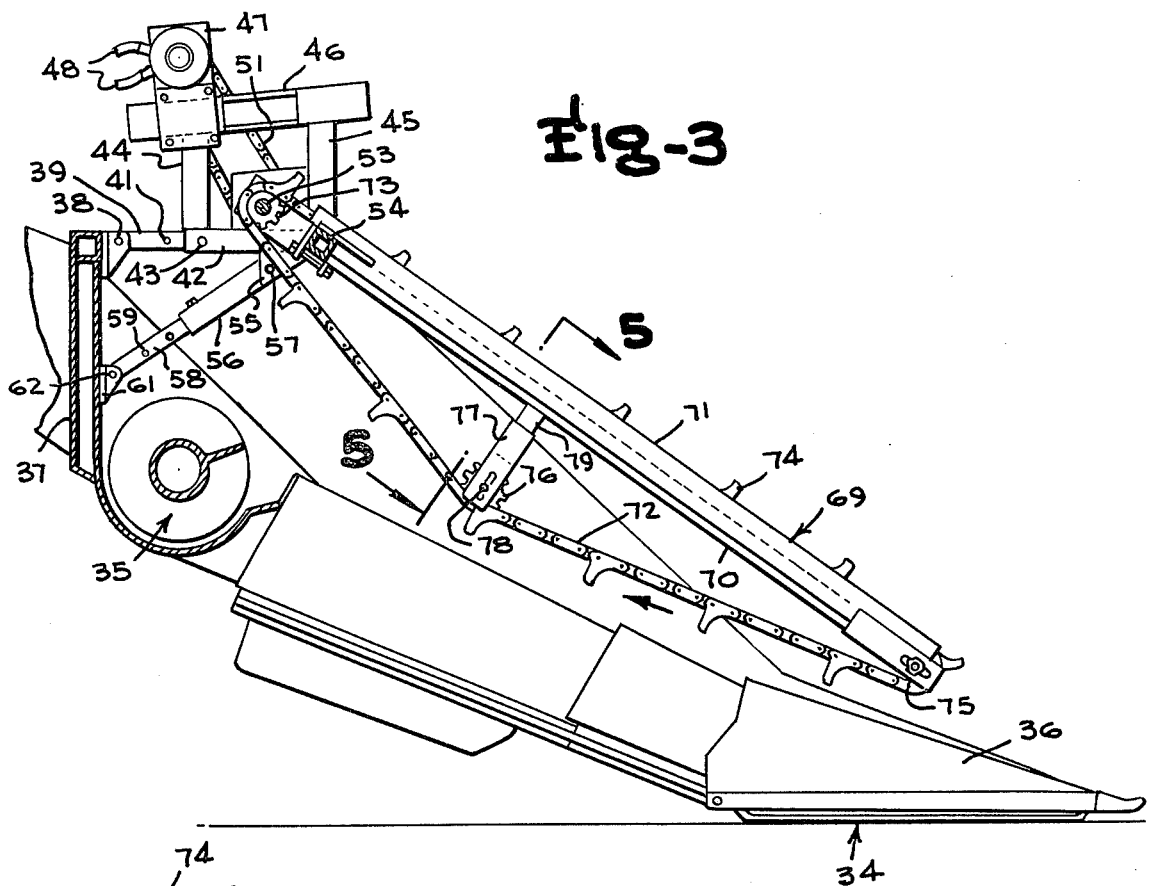
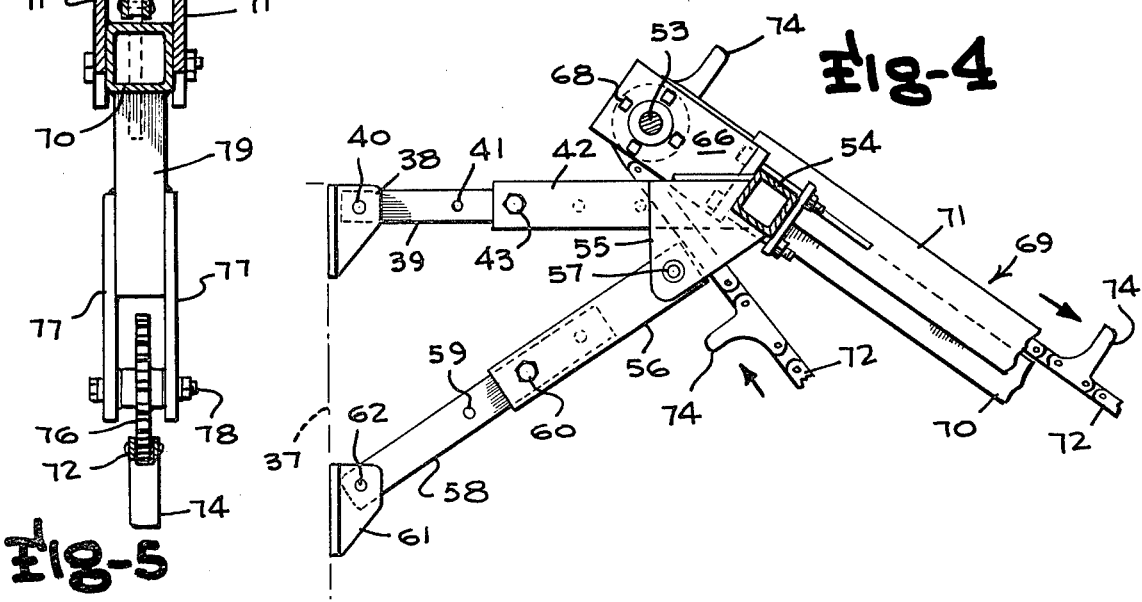

CORN PICKUP ATTACHMENT FOR A COMBINE

FIELD OF THE INVENTION

The present invention relates to combines, and more particularly to a corn pickup attachment for a combine.

DESCRIPTION OF THE PRIOR ART

Heretofore, various types of corn pickup attachments have been provided as, for example, attention is directed to prior U.S. Pat. Nos. 4,214,422, 3,719,034, 4,346,548, 4,219,992, 3,742,687, and 4,137,695. However, neither of these prior patents nor any others known to applicant achieve the advantages that the present invention achieves or accomplishes.

BACKGROUND AND SUMMARY OF THE INVENTION

In accordance with the present invention, there is provided a corn pickup attachment for a combine which includes a unique mounting means for the corn pickup members and there is also provided a highly efficient framework together with bearings and shaft supports.

An object of the present invention is to provide a corn pickup attachment for a combine that is especially suitable for use in picking up corn stalks that have fallen to the ground so that the same may be harvested.

Still a further object of the present invention is to provide a corn pickup attachment for a combine which is practical to use and relatively low in cost, and which is comparatively simple in its construction and mode of use, and which is relatively inexpensive to manufacture and efficient to use.

Other objects, features and advantages of the present invention shall become apparent as the description thereof proceeds in connection with the accompanying illustrative drawings.

BRIEF DESCRIPTION OF THE DRAWINGS

FIG. 2 is a top plan view of the combine showing the harvester in phantom lines.

FIG. 3 is a sectional view taken on the line 3—3 of FIG. 2.

FIG. 4 is a sectional view taken on the line 4—4 of FIG. 2.

FIG. 5 is an enlarged sectional view taken off of the line 5—5 of FIG. 3.

DESCRIPTION OF THE PREFERRED EMBODIMENT

Figure 1:
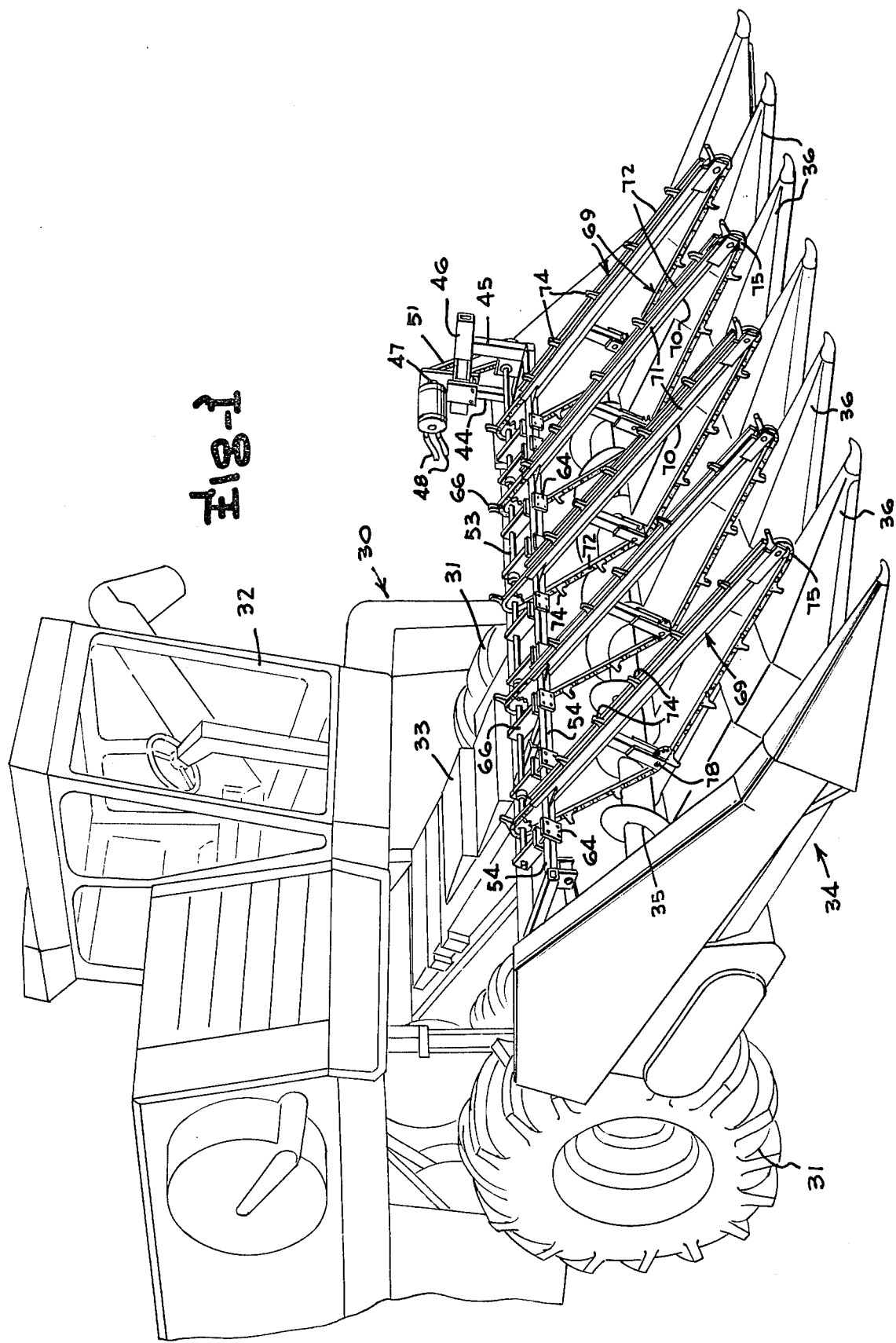
FIG. 1 is a perspective of the corn pickup attachment for a combine structured according to the present invention.

Referring in detail to the drawings, the numeral 30 indicates a conventional combine or harvester which is provided with the usual accessories such as wheels 31, a cab 32, conveyor 33, and corn pickup attachment 34 that has a horizontally disposed auger 35 therein. There is further provided the usual spaced apart, forwardly disposed snouts 36. In FIG. 3, the numeral 37 indicates a vertically disposed back member and in accordance with the present invention there is provided a framework that includes brackets 38 that are secured as by welding to the upper portion of the member 37, FIG. 3. Horizontally disposed support members 39 are connected to the pairs of brackets 38 by means of securing elements 40, and the support members 39 have a plurality of openings or apertures 41 therein so that the parts can be adjusted as desired or required as later described in this application. Horizontally disposed hollow body pieces 42 telescopically receive the support members 39, and securing elements such as bolts or screws 43 extend through the body pieces 42 and through certain of the openings 41.

Mounted on one side of the framework of the corn pickup attachment are uprights 44 and 45, FIG. 3, and a horizontal member 46 is supported by the uprights 44 and 45. A hydraulic motor 47 is suitably clamped or otherwise mounted on the member 46, and there is provided conduits or lines 48 for supplying hydraulic fluid to and from the hydraulic motor 47, and the hydraulic fluid can be supplied from a suitable source of supply. A shaft 49 is driven by the hydraulic motor 47, therebeing a sprocket 50 on the end of the shaft 50, and an endless chain 51 is trained over the sprocket 50, and the chain 51 is also trained over a sprocket 52 that is mounted on the end of an elongated shaft 53.

The numeral 54 indicates a horizontally disposed beam or bar, FIG. 4, and generally triangular shaped plates 55 are secured in place as shown in the drawings. Inclined hollow support pieces 56 are pivotally or hingedly connected to the plates 55 as at 57, and support members or braces 58 are telescopically mounted in the body pieces 56, therebeing a plurality of apertures or openings 49 in the members 58 as shown in the drawings. Screws or bolts 60 extend through the members 56 and through certain of the openings 59 for maintaining the parts in their proper adjusted position. The lower ends of the members 58 are pivotally or hingedly connected as at 62 to brackets 61 that are arranged contiguous to the member 37, and the brackets or lugs 61 are secured as by welding to the member 37.

Mounted on the bar 54 is a plurality of spaced apart sets of clamping plates 63 and 64, and the plates 63 and 64 are held in their proper position on the bar 54 by means of bolts 65. Arms or braces 66 are suitably secured as by welding to the plates 63, and bearings 67 are mounted in the arm 66 as at 68, the bearings 67 providing a support for the elongated rotating shaft 53.

Mounted above the snouts 36 are corn pickup attachments 69 which each comprise an elongated beam or channel member 70, FIG. 5, therebeing guide members 71 suitably secured to the outer surfaces of the member 70, whereby there is provided a guide rail for an endless chain 72. The chain 72 is trained over a respective sprocket 73 on the shaft 53, and the chain 72 is also trained over a sprocket 75 as well as being arranged in engagement with an idler sprocket 76, FIG. 3. The idler sprocket 76 is mounted on a suitable shaft 78 which extends between plates or elements 77, and the elements 77 are secured as by welding to a depending leg 79 that is suitably secured to the elongated member 70.

From the foregoing, it will be seen that there has been provided a corn pickup attachment for a combine, and in use with the parts arranged as shown in the drawings, a conventional combine 30 is provided with the usual forwardly projecting snouts or extensions 36 so that as the combine moves along the field of growing corn or other growing crops, the corn will be harvested and handled in the usual manner by means of the auger 35, conveyor 33 and the like. The present invention is directed to corn pickup attachments 69 which are mounted above the snouts 36 so that any corn or other crops that have fallen will be picked up and deposited into the proper position or location in the combine so that a highly efficient and improved method of harvesting is provided.

In use, with the parts arranged as shown in the drawings, a hydraulic motor 47 is arranged as shown and the hydraulic motor 47 can be suitably supported on supports such as the supports 46, 44, and 45. The motor 47 is operatively connected to a suitable source of hydraulic fluid by means of the conduit 48, and actuation of the motor 47 serves to rotate the shaft 49 which in turn drives the endless chain 51. The chain 51 is trained over the sprocket 52 on the end of the shaft 53 so that as the motor 47 is actuated, the shaft 53 is driven in the desired manner.

It will be noted that as shown in the drawings, the shaft 53 is supported in the bearings 67 so that the shaft 53 can rotate in the desired manner, and the bearings 67 are mounted in the arms or bars 66, the bars being suitably secured as by welding to the plates 63. The plates 63 are clamped in place on the beam or bar 54 by means of the bolts 65 and plates 64 so that a rigid efficient construction is provided.

The corn pickup attachment 69 can be adjusted as desired or required due to the arrangement and construction of the parts. For example, as shown in FIG. 4, the support elements 39 are connected as at 40 to the brackets 38, the brackets 38 and the brackets 61 being suitably secured to the portion 37 of the combine. The support elements 39 are telescopically mounted in the hollow tubes 42, and the support elements 39 are provided with a plurality of spaced apart apertures or openings 41 whereby suitable securing elements such as screws or bolts 43 can be extended through certain of the openings 41 in order to adjust the pickup attachment 69 inwardly or outwardly in the desired location. The tubular members 42 are secured to the beam or bar 54 so that adjustment of the parts 42 on the elements 39 provides a means of adjusting the location or position of the bar 54 and its associated parts.

In addition, there is provided inclined tubular support elements 56 which are connected as at 57 to plates or braces 55 that are also secured to the bar 54, and the support elements 56 are telescopically mounted on members 58 which are pivotally supported as at 62 to the lower brackets 61. By loosening the bolts or screws 60 and shifting or telescoping the members 56 on the members 58 to the desired location, and then inserting the securing elements 60 through the proper openings 59, the parts can be maintained in their proper location or position.

Further, the corn pickup attachments 69 each include a channel member 70 which has spaced apart side plates 71 secured thereto that define guide rails for the endless moving chains 72. The chains 72 are provided with a plurality of spaced apart fingers 74 thereon so that any corn that has fallen will be picked up by the moving fingers 74 and deposited in the proper location in the machine or combine. It will be seen that the chains 72 are trained over the sprocket 73, and the plurality of the sprocket 73 are mounted on the shaft 53. The chains 72 are also trained over sprocket 75 on the front end of the unit 69, and the chains 72 are also trained over or arranged in engagement with idler sprockets 76 which are supported on a shaft 78 in conjunction with support elements 77 and 79, FIG. 5.

The parts can be made of any suitable material and in different shapes or sizes as desired or required.

The present invention possesses certain important features and differences not found in the prior patents. For example, the framework is different. With reference to prior U.S. Pat. No. 4,137,695, this prior patent utilizes a two-tubed framework that is framed with braces whereas applicant has only a single frame and the arms are the gathering chains. In prior U.S. Pat. No. 4,137,695 there are individual units with a turn buckle behind them, and the gathering chain on it has a different type idler from applicant's and applicant's does not have snow cones on the ends thereof. Further, the bearing arrangement in U.S. Pat. No. 4,137,695 is different from the present invention, and it appears that in U.S. Pat. No. 4,137,695 that two bearings are used on each chain plus three or four main bearings that hold the shaft up, and there is a lot of difference between the frames. Thus, applicant's frame is entirely different from the framework in the prior patents such as prior U.S. Pat. No. 4,137,695. Further, prior U.S. Pat. No. 4,137,695 uses turn buckles which are not utilized in the present invention, and in the present invention the gathering frame is all in one piece, and there is the telescoping arrangement on the bottom end to lower and raise it to the position that is desired or required.

It would appear that in U.S. Pat. No. 4,137,695, that the chain would come down and hit the snouts and this prior patent has welded thereon a piece on the snout of each combine and with the present invention, the chain does not come down so that it touches the snout.

Further, the idler is different, and in the present invention the idler is basically in the middle, whereas in prior U.S. Pat. No. 4,137,695, the idler is towards the back.

With reference to prior U.S. Pat. No. 4,346,548, this prior patent appears to have a boxed frame and the gathering chain runs down on the same order. In prior U.S. Pat. No. 4,346,548, the chain is hung from the top and appears to be, on a pressure spring, and this prior patent is not clear on this point, but it does appear to be just a boxed frame with two shafts and the bearing arrangement is not clear or appears different from the present invention including the spacing of the bearings. Also, in this prior U.S. Pat. No. 4,346,548, the snow cones on the outer snouts appear to run off of tube gears. It does not appear to be clear how the bearings are arranged in U.S. Pat. No. 4,346,548, and there is no idler in the center. There is just an idler on the lower end.

With reference to prior U.S. Pat. No. 3,719,034, this is merely a harvester/sweeper and is not anticipatory of the present invention. In prior U.S. Pat. No. 4,219,992, there is shown a row crop attachments for combines which is for harvesting soy beans and similar crops but has no significant similarity to the present invention. In prior U.S. Pat. No. 3,742,687, there is shown a pickup attachment for corn harvesters which also appears to be substantially different from the present invention.

It will be understood that the corn pickup attachment for a combine can be used for four, six, eight, or twelve row corn heads.

Basically, the present invention is an attachment that goes on the corn head of a combine so as to pick up corn when the corn has fallen down because of wind, and which permits the corn to feed into the combine more easily. The attachment is driven by the hydraulic motor, such as the motor 47 which is off of the combine, which in turn by way of a chain 51 drives a drive-shaft 53 that extends horizontally across the corn head. The drive shaft 53 has double bearings for each row with one bearing on each side of the drive gear. There is a two inch tubing 70 that runs parallel with the corn snout 36. Each tubing 70 has a two inch side rail 71, and in between side rail 71 there is a gathering chain 72 that is driven by the drive-shaft 53 and in essence, the chain 72 with the fingers 74 pick the corn up off the ground and feed it into the corn head.

With further reference to prior U.S. Pat. No. 4,137,695, as to the present invention, the framework is entirely different and the two inventions are designed differently. In the present invention as compared to this prior patent, there is no plate across the snout, and there is no roller cone on the outside, and there are no turn buckles as they are on this prior patent. There is a single frame versus a double frame construction, and with this prior patent the idler is in the back, whereas with the present invention the idler is in the middle. Further, in this prior patent, there is a different hinge arrangement, and there is provided a bar which pivots as a hinge, and with the present invention the bottom has a telescoping shaft arrangement which permits the operator of the machine to raise or lower the device.

As to prior U.S. Pat. No. 4,346,548, the boxed frame distinguishes this patent from the present invention and it also has a bracket which runs off the top. Further, on this prior patent there are no idlers and it is not clear how the bearings are utilized.

It will be understood that the combine 30 can have the usual standard or conventional accessories such as a grain tank, pressurized cab, power steering, hydraulic swing unloading auger, and corn heads which may be in four, five, six, and eight row sizes. Cutting platforms in different widths can be used.

While the present invention has been specifically described for use with picking up corn, it is to be understood that the present invention can be used with other crops besides corn.

While several embodiments of the present invention have been illustrated and described herein in particular detail, it will be understood that variations and modifications may be effected without departing from the spirit and scope of the novel concepts of this invention.

What is claimed:

1. In a corn pickup attachment for a combine that includes a wheeled unit embodying a cab, conveyor and a horizontally disposed transverse auger, a plurality of spaced apart, forwardly disposed snouts, a vertically disposed back member, a U-shaped framework including sets of upper parallel brackets affixed to the upper portion of said back member, horizontally disposed support members connected to said brackets, there being a plurality of spaced apart openings in said support members, hollow body pieces telescopically receiving said support members, securing elements extending through certain of the openings in said support members and said body pieces, uprights mounted on one side of the framework, a horizontally disposed support piece on said uprights, a hydraulic motor mounted on said support piece, a horizontally disposed bar mounted on said framework, a plurality of sets of front and rear plates mounted on said bar, securing elements for holding said plates together, a plurality of spaced parallel support elements affixed to said rear plates, greaseless bearings mounted on said support elements, a drive-shaft extending through said bearings, a plurality of spaced apart sprocket members mounted on said drive-shaft, chain and sprocket means operatively connecting said hydraulic motor and said drive-shaft together, each corn pickup attachment including a hollow tubing mounted above each snout, side rails affixed to said tubing providing guide railing, inclined support pieces arranged angularly with respect to said support members, lower brackets affixed to the lower portion of said back member, braces having their lower ends connected to said last named brackets, there being spaced apart openings in said braces, said braces being telescopically received in said support pieces, securing elements extending through said support pieces and through certain of the openings in said braces, endless chains for travel in said guide railing, and said last name endless chains have a plurality of spaced apart fingers thereon, said last named endless chains being arranged in engagement with the sprocket members on said drive-shaft, a leg depending from the intermediate portion of said tubing and secured thereto, and an idler sprocket mounted below said leg and operatively engaging the endless chain having the pickup fingers thereon.

2. The structure as defined in claim 1 and further including elements depending from said leg, and a shaft mounted in said last named elements for supporting said idler sprocket.

* * * * *